(12) United States Patent
Chou

(10) Patent No.: US 8,154,568 B2
(45) Date of Patent: Apr. 10, 2012

(54) COLOR FILTER

(75) Inventor: Meng-Chieh Chou, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 301 days.

(21) Appl. No.: 12/563,238

(22) Filed: Sep. 21, 2009

(65) Prior Publication Data

US 2010/0283803 A1 Nov. 11, 2010

(30) Foreign Application Priority Data

May 7, 2009 (CN) .......................... 2009 1 0302150

(51) Int. Cl.
*G09G 5/02* (2006.01)
*G09G 3/36* (2006.01)
*G02F 1/1335* (2006.01)
(52) U.S. Cl. ........................... 345/695; 345/88; 349/108
(58) Field of Classification Search ........................ None
See application file for complete search history.

(56) References Cited

U.S. PATENT DOCUMENTS

| | | | |
|---|---|---|---|
| 2007/0109329 A1* | 5/2007 | Roh et al. ....................... | 345/694 |
| 2008/0049048 A1 | 2/2008 | Credelle et al. | |
| 2009/0179826 A1* | 7/2009 | Malka et al. ..................... | 345/32 |
| 2010/0118045 A1* | 5/2010 | Brown Elliott et al. ...... | 345/589 |

FOREIGN PATENT DOCUMENTS

CN 101013174 A 8/2007

OTHER PUBLICATIONS

"Subpixel arrangements and color image rendering methods for multiprimary displays", Gabor Kutas, et al., Journal of Electronic Imaging, vol. 15, issue 2 (Apr.-Jun. 2006).

* cited by examiner

*Primary Examiner* — Andrew L Sniezek
(74) *Attorney, Agent, or Firm* — Altis Law Group, Inc.

(57) ABSTRACT

A color filter includes a transparent base board and a pixel portion formed on the base board. The pixel portion includes a plurality of pixels and each pixel includes eight sub-pixels in at least four different colors. Light passing through each pixel is colored to be in a color formed by mixed light emitting from the eight sub-pixels and changed by changing the luminance of light respectively passing through the sub-pixels, and light passing through the plurality of pixels cooperatively form colored images.

14 Claims, 4 Drawing Sheets

COLOR FILTER

BACKGROUND

1. Technical Field

The present disclosure relates to color filters, and particularly to a color filter having improved pixel structure.

2. Description of Related Art

Color filters are widely used. For example, liquid crystal displays (LCD) need a color filter installed therein to produce and display color images.

Referring to FIG. 3 and FIG. 4, a conventional color filter 100 generally includes a base board 10, a shielding portion 11, a pixel portion 12 and an electrode layer 13. The base board 10 is a transparent board. The shielding portion 11 is a black matrix made of resin or chrome and defining a plurality of through holes therein. The shielding portion 11 is formed on the base board 10 to shield portions of the base board 10 and the base board 10 covers the bottoms of the through holes to form a plurality of wells 112. The pixel portion 12 includes a plurality of pixels 120, and each pixel 120 includes a plurality of sub-pixels 121/122/123/124. In fabrication, the pixel portion 12 is made of colored transparent materials, such as resin. The wells 112 are filled with the colored transparent materials to form the sub-pixels 121/122/123/124, and these sub-pixels 121/122/123/124 cooperatively form the pixels 120. Particularly, each pixel 120 is a square area including four adjacent square sub-pixels 121, 122, 123, 124, wherein the sub-pixel 121 is red, the sub-pixel 123 is blue, and the sub-pixels 122, 124 are green. Thus, light passing through the pixel 120 can form a spectrum of visible colors. The electrode layer 13 is a transparent conductive film made of indium tin oxide (ITO), which is formed on the shielding 11 and the pixel portion 12 to sandwich the shielding 11 and the pixel portion 12 between the base board 10 and the electrode layer 13.

In assembly, the color filter 100 is mounted on an electronic device (e.g., a mobile phone or a PDA) and used as a portion of a display of the electronic device. The base board 10 is positioned outside, and the electrode layer 13 is positioned inside and towards a subsidiary electrode layer (not shown) of the display. Liquid crystal (not shown) is disposed between the electrode layer 15 and the subsidiary electrode layer.

In use, electric potentials are disposed on the two electrode layers to generate an electric field between the two electrode layers. The liquid crystal is controlled to have various levels of brightness by the electric field to form images. A backlight (not shown) is provided and emits light travelling through the subsidiary electrode layer, the liquid crystal, and then the color filter 100. When light arrives at the pixel 120, the sub-pixels 121, 122, 123, 124 respectively allow red, green and blue light to pass through. Thus, the light emitting from the pixel 120 is colored by a mixture of the colors emitting from the sub-pixels 121, 122, 123, 124. When the luminance of light passing through the sub-pixels 121/122/123/124 is varied, the color of the light emitting from the pixel 120 can be changed. Therefore, the pixels 120 can respectively change color and brightness, and light passing through the plurality of pixels 120 can cooperatively form colored images. The black matrix 13 shields opaque portions adjacent to the color filter 100 (e.g., wires mounted adjacent to the color filter 100) and prevents optical interferences between adjacent pixels 120 or sub-pixels 121/122/123/124.

However, in the color filter 100, the sub-pixels 121/122/123/124 have only three basic colors. Thus, the number of colors capable of being displayed by each pixel 140 may be less, and the color gamut of the color filter 100 may be narrow. Furthermore, each sub-pixel 121/122/123/124 only allows light in one corresponding basic color (red or green or blue) to pass through. Light arriving at a sub-pixel 121/122/123/124 will be blocked if the color of the light is different to the color of the sub-pixel 121/122/123/124. Therefore, if the areas of the sub-pixels 121, 122, 123 and 124 are equal to each other, red or blue light can only pass through about ¼ transparent area of a pixel 120 (i.e., the red sub-pixel 121 or the blue sub-pixel 123), and green light can only pass through about ½ transparent area of a pixel 120 (i.e., the green sub-pixels 122 and 124). Thus, much light power of the backlight will be wasted, and a luminance of the display using the color filter 100 may be decreased.

Therefore, there is room for improvement within the art.

BRIEF DESCRIPTION OF THE DRAWINGS

Many aspects of the present color filter can be better understood with reference to the following drawings. The components in the various drawings are not necessarily drawn to scale, the emphasis instead being placed upon clearly illustrating the principles of the present color filter. Moreover, in the drawings, like reference numerals designate corresponding parts throughout the figures.

DETAILED DESCRIPTION

Figure 1:
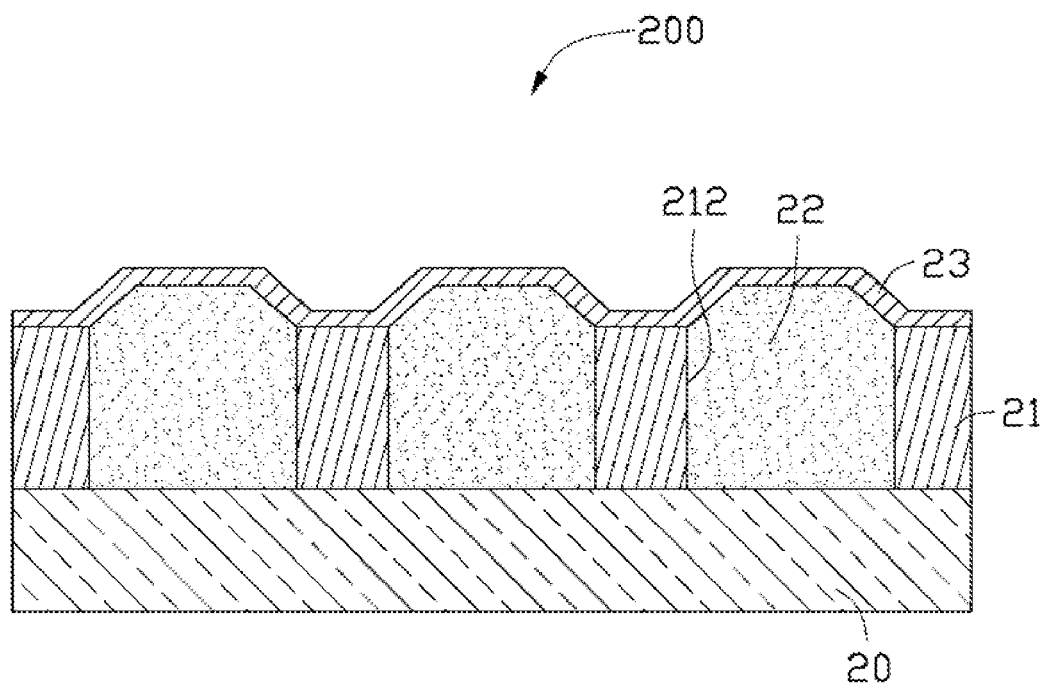
FIG. 1 is a partially cross-sectional view of a color filter, according to an exemplary embodiment.
Figure 2:
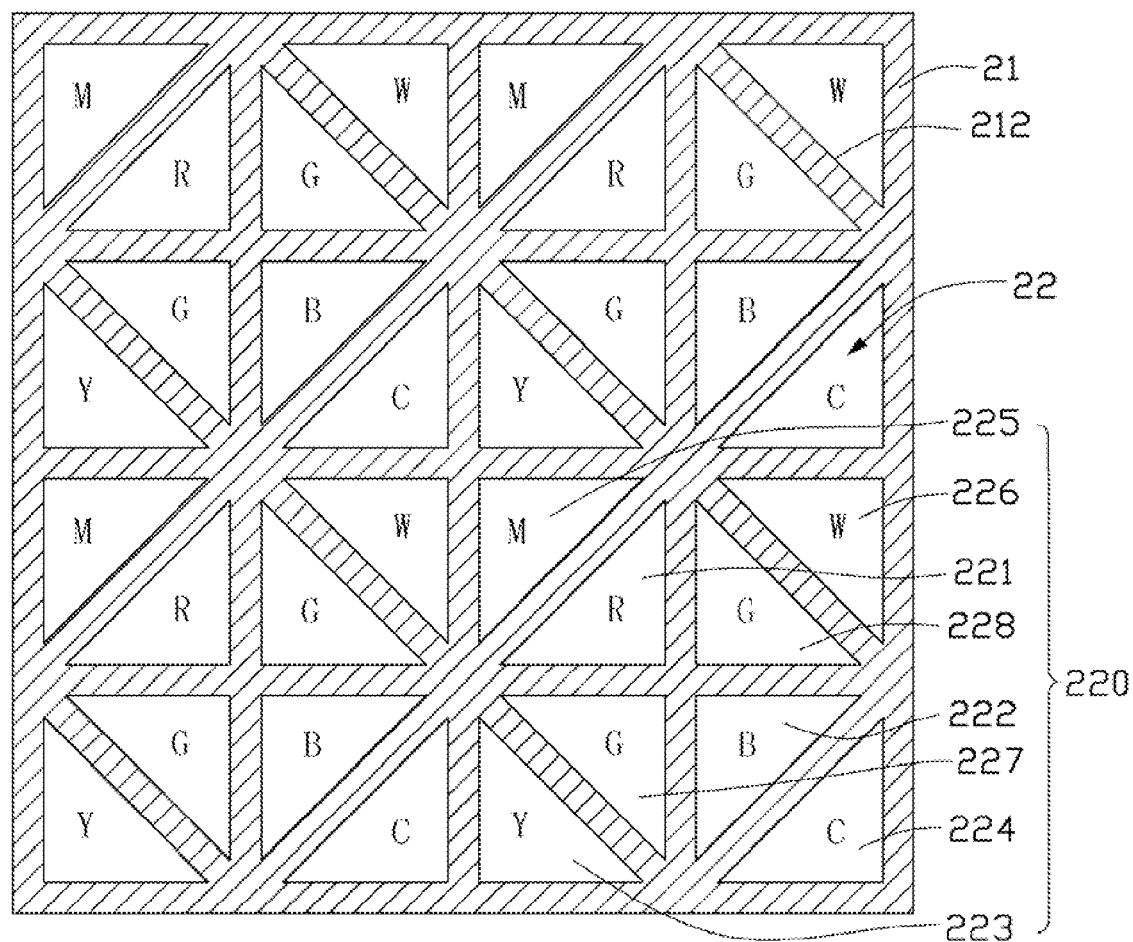
FIG. 2 is a schematic view of a part of a pixel portion of the color filter shown in FIG. 1.
Figure 3:
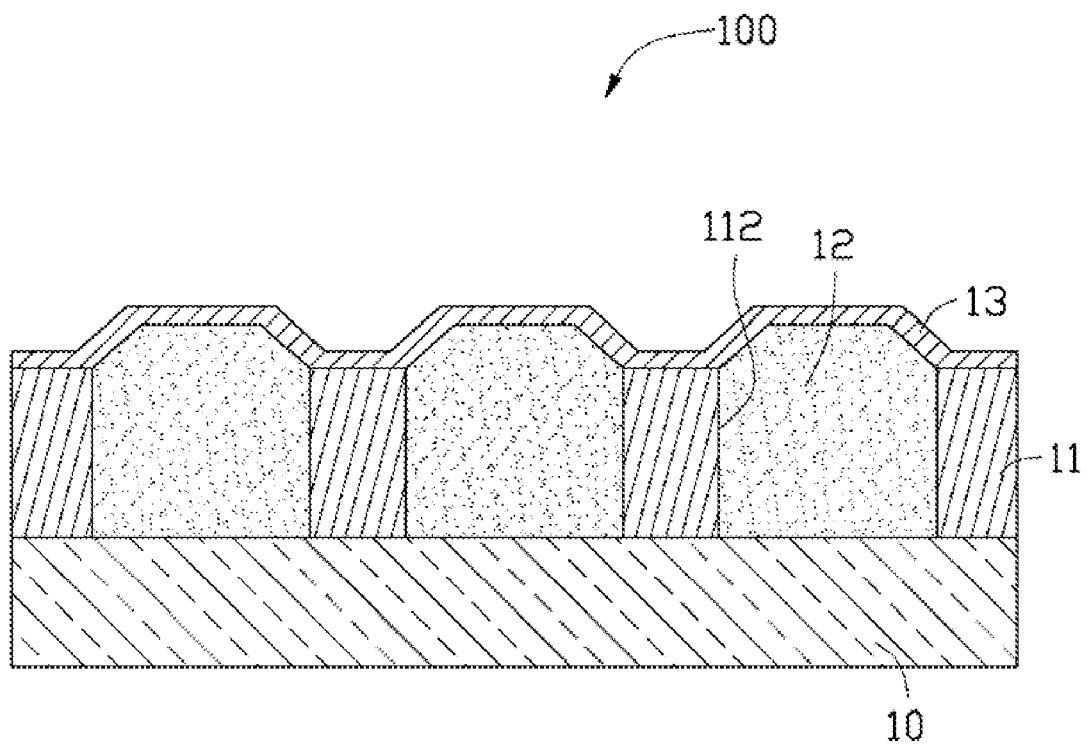
FIG. 3 is a partially cross-sectional view of a conventional color filter.
Figure 4:
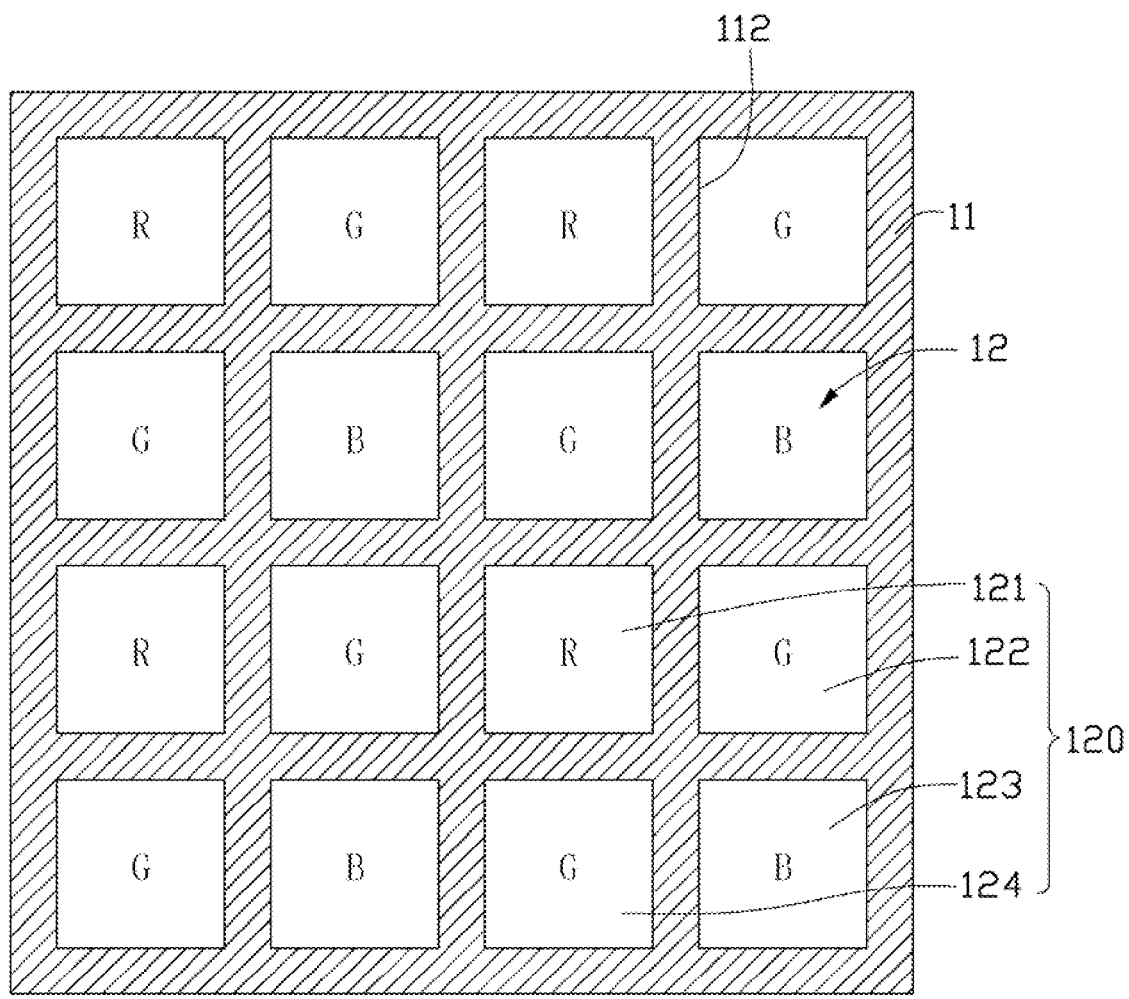
FIG. 4 is a schematic view of a part of a pixel portion of the color filter shown in FIG. 3.

Referring to FIG. 1 and FIG. 2, a color filter 200 according to an exemplary embodiment is provided. The color filter 200 is used in a display of an electronic device such as a mobile phone, a personal digital assistant (PDA) or a laptop computer.

The color filter 200 includes a base board 20, a shielding portion 21, a pixel portion 22 and an electrode layer 23. The base board 20 is a transparent board, which is made of glass or other transparent materials. The shielding portion 21 is a black matrix made of black resin or chrome and defining a plurality of through holes 212 therein. A cross section of each hole 212 is shaped substantially as an isosceles right-angled triangle. The shielding portion 21 is formed on the base board 10 to shield portions of the base board 20.

The pixel portion 22 includes a plurality of pixels 220. Each pixel 220 includes a plurality of sub-pixels 221/222/223/224/225/226/227/228. In fabrication, the pixel portion 22 is made of colored transparent materials, such as resin. The colored transparent materials are formed on the base board 20 and are filled in the holes 212 to form the plurality of sub-pixels 221/222/223/224/225/226/227/228, thus each sub-pixel 221/222/223/224/225/226/227/228 is shaped substantially as an isosceles right-angled triangle. These sub-pixels 221/222/223/224/225/226/227/228 cooperatively form the plurality of pixels 220. Particularly, each pixel 220 is a square area including eight adjacent isosceles right-angled triangular sub-pixels 221, 222, 223, 224, 225, 226, 227, 228. The sub-pixels 221, 222, 223, 224, 225, 226 are respectively red, blue, yellow, cyan, magenta and white, and the sub-pixels 227, 228 are green. The sub-pixels 221, 222, 227, 228 are positioned in a central area of the pixel 220, and the right-angles of the sub-pixels 221, 222, 227, 228 are positioned inwards. The sub-pixels 223, 224, 225, 226 are positioned in a peripheral area of the pixel 220, and the right-angles of the sub-pixels 223, 224, 225, 226 are positioned outwards. Thus, the eight sub-pixels 221, 222, 223, 224, 225, 226, 227, 228 cooperatively form a square, i.e., an outside shape of the pixel 220.

The electrode layer 23 is a transparent conductive film made of indium tin oxide (ITO), which is formed on the shielding portion 21 and the pixel portion 22 to sandwich the shielding portion 21 and the pixel portion 22 between the base board 20 and the electrode layer 23.

In assembly, the color filter 200 is mounted on an electronic device (e.g., a mobile phone or a PDA) and used as a portion of a display of the electronic device. The base board 20 is positioned outside the electronic device, and the electrode layer 23 is positioned inside the electronic device, and towards a subsidiary electrode layer (not shown) of the display. Liquid crystal (not shown) is disposed between the electrode layer 25 and the subsidiary electrode layer.

In use, electric potentials are disposed on the two electrode layers to generate an electric field between the two electrode layers. The liquid crystal is partially changed to be light or dark by the electric field to form images. A backlight (not shown) is provided and emits light travelling through the subsidiary electrode layer, the liquid crystal, and then the color filter 200. When light arrives at the pixel 220, the sub-pixels 221, 222, 223, 224, 225, 226 respectively allow red, blue, yellow, cyan, magenta and white light to pass through, and the sub-pixels 227, 228 allow green light to pass through. Thus, the light emitting from the pixel 220 is mixed light emitting from the sub-pixels 221, 222, 223, 224, 225, 226, 227, 228 to form various colors. When the luminance of light passing through the sub-pixels 221/222/223/224/225/226/227/228 is varied, the color of the light emitting from the pixel 220 can be changed. Therefore, the pixels 220 can respectively change color, and light passing through the plurality of pixels 220 can cooperatively form colored images. The black matrix 213 can shield opaque portions adjacent to the color filter 200 (e.g., wires mounted adjacent to the color filter 200) and prevent optical interferences between adjacent pixels 220 or sub-pixels 221/222/223/224/225/226/227/228.

In the present color filter 200, each pixel 220 includes eight sub-pixels 221, 222, 223, 224, 225, 226, 227, 228, wherein the sub-pixels 221, 222, 223, 224, 225, 226 are respectively red, blue, yellow, cyan, magenta and white, and the sub-pixels 227, 228 are green. Compared with most conventional color filters (e.g., the color filter 100 mentioned in the Description of Related Art), the pixels 220 of the color filter 200 have more colors. Thus, the number of colors capable of being displayed by each pixel 220 is increased, and the color filter 200 produces a wider color gamut.

Furthermore, as mentioned in the Description of Related Art, in the color filter 100, if the areas of the sub-pixels 121, 122 and 123 are equal to each other, red or blue light can only pass through about ¼ transparent area of a pixel 120 (i.e., the red sub-pixel 121 or the blue sub-pixel 123), and green light can only pass through about ½ transparent area of a pixel 120 (i.e., the green sub-pixels 122 and 124). Therefore, much light from the backlight will be wasted, and a luminance of the display using the color filter 100 may be decreased. In the present color filter 200, however, each pixel 220 includes eight sub-pixels 221(red), 222(blue), 223(yellow), 224(cyan), 225(magenta), 226(white), 227(green) and 228 (green). In particular, yellow light is formed by mixed red light and green light, cyan light is formed by mixed green light and blue light, magenta light is formed by mixed red light and blue light, and white light is formed by mixed red light, blue light and green light. Therefore, the yellow sub-pixel 223 allows red light and green light to pass through, the cyan sub-pixel 224 allows green light and blue light to pass through, the magenta sub-pixel 225 allows red light and blue light to pass through, and the white sub-pixel 226 allows red light, green light and blue light to pass through. When light in three basic colors (red, green, blue) arrives at a pixel 220, red light can pass through the sub-pixels 221, 223, 225, 226, green light can pass through the sub-pixels 227, 28, 223, 224, 226, and blue light can pass through the sub-pixels 222, 224, 225, 226. If the areas of the eight sub-pixels 221, 222, 223, 224, 225, 226, 227, 228 are equal to each other, red or blue light can pass through about ½ transparent area of a pixel 120 (i.e., the sum of the areas of the sub-pixels 221, 223, 225, 226 or the sum of the areas of the sub-pixels 222, 224, 225, 226), and green light can pass through about ⅝ transparent area of a pixel 120 (i.e., the sum of the areas of the sub-pixels 227, 28, 223, 224, 226). Therefore, compared with the color filter 100, if the number of the pixels 120 of the color filter 100 is equal to the number of the pixels 220 of the color filter 200, and the transparent area of each pixel 120 (i.e. the sum of the areas of the sub-pixels 121, 122, 123, 124) is equal to the transparent area of each pixel 220 (i.e. the sum of the areas of the sub-pixels 221, 222, 223, 224, 225, 226, 227, 228), the color filter 200 allows more light to pass through than the color filter 100. Thus, the color filter 200 has a higher efficiency, and the display using the color filter 200 is brighter.

The holes 212 can also be formed to be in other shapes and positioned in other patterns. Correspondingly, the sub-pixels 221, 222, 223, 224, 225, 226, 227, 228 and the pixels 220 can be in other shapes. Colors of the sub-pixels 221, 222, 223, 224, 225, 226, 227, 228 can also be varied according to need.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A color filter, comprising:
a transparent base board; and
a pixel portion formed on the base board, the pixel portion including a plurality of pixels, each pixel including eight sub-pixels in at least four different colors; four of the eight sub-pixels positioned in a central area of the pixel, and another four of the eight sub-pixels positioned in a peripheral area of the pixel; wherein light passing through each pixel is colored to be in a color formed by mixed light emitting from the eight sub-pixels and changed by changing the luminance of light respectively passing through the sub-pixels, and light passing through the plurality of pixels cooperatively form colored images.

2. The color filter as claimed in claim 1, wherein two of the eight sub-pixels of each pixel are respectively red and blue.

3. The color filter as claimed in claim 1, wherein two of the eight sub-pixels of each pixel are green.

4. The color filter as claimed in claim 1, wherein three of the eight sub-pixels of each pixel are respectively yellow, cyan and magenta.

5. The color filter as claimed in claim 1, wherein one of the eight sub-pixels of each pixel is white.

6. The color filter as claimed in claim 1, wherein the pixel portion is formed by colored transparent materials.

7. The color filter as claimed in claim 1, further comprising a shielding portion formed on the base board and defining a plurality of holes therein, wherein the sub-pixels are formed in the holes and cooperatively form the pixels.

8. The color filter as claimed in claim 7, wherein the shielding portion is made of black resin or chrome.

9. The color filter as claimed in claim 7, wherein the holes and the sub-pixels formed therein are substantially isosceles right-angled triangles.

10. The color filter as claimed in claim 9, wherein the right-angles of the four central sub-pixels positioned inwards and the right-angles of the four peripheral sub-pixels positioned outwards.

11. The color filter as claimed in claim 10, wherein two of the four central sub-pixels are respectively red and blue, and another two of the four central sub-pixels are green.

12. The color filter as claimed in claim 10, wherein the four peripheral sub-pixels are respectively yellow, cyan, magenta and white.

13. The color filter as claimed in claim 7, further comprising an electrode layer formed on the shielding portion and the pixel portion to sandwich the shielding portion and the pixel portion between the base board and the electrode layer.

14. The color filter as claimed in claim 13, wherein the electrode layer is a transparent conductive film made of indium tin oxide (ITO).

* * * * *